(12) United States Patent
Ikki

(10) Patent No.: US 10,775,773 B2
(45) Date of Patent: Sep. 15, 2020

(54) MANAGEMENT APPARATUS AND MANAGEMENT SYSTEM OF DEVICE INFORMATION AND POSITION INFORMATION

(71) Applicant: FANUC CORPORATION, Yamanashi (JP)

(72) Inventor: Takeshi Ikki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 161 days.

(21) Appl. No.: 15/827,286

(22) Filed: Nov. 30, 2017

(65) Prior Publication Data

US 2018/0164789 A1    Jun. 14, 2018

(30) Foreign Application Priority Data

Dec. 12, 2016  (JP) ................... 2016-240656

(51) Int. Cl.
*G06F 16/00* (2019.01)
*G05B 19/418* (2006.01)

(52) U.S. Cl.
CPC ... *G05B 19/41845* (2013.01); *G05B 19/4185* (2013.01); *G05B 19/41865* (2013.01); *G05B 2219/31151* (2013.01); *G05B 2219/31333* (2013.01); *G05B 2219/31418* (2013.01); *G05B 2219/31422* (2013.01); *Y02P 90/02* (2015.11)

(58) Field of Classification Search
CPC ...... G06F 13/00; G06F 3/048; G06F 11/1469; G06F 11/1448; G05B 2219/31333; G05B 2219/31422; G05B 2219/31418; G05B 19/41845; G05B 2219/31151; G05B 19/4185; G05B 19/41865; Y02P 90/02
See application file for complete search history.

(56) References Cited

U.S. PATENT DOCUMENTS

| 5,129,074 A | * | 7/1992 | Kikuchi | ................. G06F 16/00 |
| | | | | 711/173 |
| 5,384,673 A | * | 1/1995 | Yoshioka | .............. G06F 3/0601 |
| | | | | 324/210 |
| 5,525,902 A | * | 6/1996 | Nakajima | ............. G06F 3/0601 |
| | | | | 324/212 |

(Continued)

FOREIGN PATENT DOCUMENTS

| CN | 103885394 A | 6/2014 |
| CN | 104483949 A | 4/2015 |

(Continued)

OTHER PUBLICATIONS

Office Action in Japanese Application No. 2016-240656, dated Jun. 19, 2018, 6 pp.

(Continued)

*Primary Examiner* — Jean M Corrielus
(74) *Attorney, Agent, or Firm* — Hauptman Ham, LLP

(57) ABSTRACT

A management apparatus acquires backup data from a plurality of devices, and stores the acquired backup data in a database in association with position information of the plurality of devices. The management apparatus restores the backup data included in the database, to the device that is present at a position corresponding to the position information associated with the backup data.

3 Claims, 21 Drawing Sheets

(56) References Cited

U.S. PATENT DOCUMENTS

| | | | | |
|---|---|---|---|---|
| 5,913,220 | A * | 6/1999 | Takahashi | G06T 11/60 |
| | | | | 715/209 |
| 8,082,229 | B2 * | 12/2011 | Kaijima | G06F 11/1464 |
| | | | | 707/652 |
| 8,397,264 | B2 * | 3/2013 | Ansari | H04L 29/06027 |
| | | | | 725/74 |
| 9,400,877 | B2 * | 7/2016 | Isozaki | G06F 21/31 |
| 10,235,089 | B2 * | 3/2019 | Shinozaki | G06F 11/14 |
| 2002/0049512 | A1 | 4/2002 | Mizuno et al. | |
| 2004/0260899 | A1 * | 12/2004 | Kern | G06F 11/2069 |
| | | | | 711/162 |
| 2008/0229208 | A1 * | 9/2008 | Sahashi | G06F 3/0486 |
| | | | | 715/736 |
| 2009/0037689 | A1 * | 2/2009 | Kanuri | G06F 13/385 |
| | | | | 711/208 |
| 2009/0049328 | A1 * | 2/2009 | Hattori | G06F 16/10 |
| | | | | 714/1 |
| 2010/0042598 | A1 * | 2/2010 | Shinjo | G06F 16/90344 |
| | | | | 707/640 |
| 2010/0298955 | A1 | 11/2010 | Grgic et al. | |
| 2012/0254428 | A1 * | 10/2012 | Isozaki | G06F 21/31 |
| | | | | 709/225 |
| 2014/0172121 | A1 | 6/2014 | Li et al. | |
| 2015/0163163 | A1 * | 6/2015 | Kato | H04L 47/76 |
| | | | | 709/226 |
| 2016/0094700 | A1 * | 3/2016 | Lee | H04W 8/245 |
| | | | | 455/419 |
| 2017/0055128 | A1 * | 2/2017 | Smith | H04W 4/029 |
| 2017/0118789 | A1 * | 4/2017 | Lee | H04W 8/245 |
| 2018/0059946 | A1 * | 3/2018 | Kunii | G06F 3/0631 |

FOREIGN PATENT DOCUMENTS

| | | | | |
|---|---|---|---|---|
| CN | 104656605 | A | 5/2015 | |
| CN | 104914818 | A | 9/2015 | |
| EP | 2256635 | A1 | 12/2010 | |
| JP | 09-305212 | A | 11/1997 | |
| JP | 2005-202774 | A | 7/2005 | |
| JP | 2013-15979 | A * | 4/2013 | G06F 13/00 |
| JP | 2014-59838 | A | 4/2014 | |
| JP | 2014-164598 | A | 9/2014 | |

OTHER PUBLICATIONS

Office Action in CN Application No. 201711320498.X, dated Jun. 11, 2019, 14pp.

* cited by examiner

FIG.20

DEVICE 1
POSITION INFORMATION:
(x,y)=(-0.531,0.0010)
IP ADDRESS: 192.168.1.101
MAC ADDRESS: 01:23:45:67:89:01
NO SETTING DATA

DEVICE2
POSITION INFORMATION: (x,y)=(14.846,4.350)
IP ADDRESS: 192.168.1.102
MAC ADDRESS: 01:23:45:67:89:02
NO SETTING DATA

DEVICE3
POSITION INFORMATION: (x,y)=(30.161,9.113)
IP ADDRESS: 192.168.1.103
MAC ADDRESS: 01:23:45:67:89:03
NO SETTING DATA

DEVICE 1
POSITION INFORMATION: (x,y)=(-0.531,0.0010)
IP ADDRESS: 192.168.1.101
MAC ADDRESS: 01:23:45:67:89:01
SETTING DATA 1

DEVICE 2
POSITION INFORMATION: (x,y)=(14.846,4.350)
IP ADDRESS: 192.168.1.102
MAC ADDRESS: 01:23:45:67:89:02
SETTING DATA 2

DEVICE 3
POSITION INFORMATION: (x,y)=(30.161,9.113)
IP ADDRESS: 192.168.1.103
MAC ADDRESS: 01:23:45:67:89:03
SETTING DATA 3

:

MANAGEMENT APPARATUS AND MANAGEMENT SYSTEM OF DEVICE INFORMATION AND POSITION INFORMATION

RELATED APPLICATIONS

The present application claims priority to Japanese Application Number 2016-240656 filed Dec. 12, 2016, the disclosure of which is hereby incorporated by reference herein in its entirety.

BACKGROUND OF THE INVENTION

1. Field of the Invention

The present invention relates to a management apparatus and a management system of device information and position information, and particularly relates to a management apparatus and a management system capable of backup and restore based on position information of a device.

2. Description of the Related Art

There is known an apparatus capable of communicating with a plurality of devices represented by numerical controllers via a network to thereby manage the devices. For example, Japanese Patent Application Laid-Open No. 09-305212 indicates that a host computer that manages a plurality of numerical controllers performs a software setting needed by each of the numerical controllers via a network.

However, Japanese Patent Application Laid-Open No. 09-305212 does not refer to a backup method and a restore method of the device. For example, in the case where a numerical controller or a machine tool in a line is replaced or in the case where, based on an existing line, the same line as the existing line is newly installed, there is a request to restore backup data acquired from an existing device to a new device. In such a case, conventionally, a network administrator has been required to reset the same IP address as that of the previous device in the device obtained by the replacement or find the backup data of the existing device corresponding to the new device and restore the backup data to the new device.

SUMMARY OF THE INVENTION

The present invention has been made in order to solve the above problem, and an object thereof is to provide a management apparatus and a management system capable of backup and restore based on position information of a device.

A management apparatus according to the present invention is communicably connected to a plurality of devices, and stores backup data of the plurality of devices in a database. The management apparatus includes a position information request section that acquires position information of each of the plurality of devices, and a device information association section that acquires the backup data from each of the plurality of devices and stores the backup data in the database in association with the position information. The device information association section restores the backup data included in the database, to the device that is present at a position corresponding to the position information associated with the backup data.

The device information association section may restore the backup data included in the database to the device that is positioned within a predetermined error range from the position information associated with the backup data.

The device information association section may compare relative positional relationships between the position information associated with the backup data of the plurality of devices included in the database and the position information of the plurality of devices serving as restore destinations, and restore the backup data between the devices having pieces of position information corresponding to each other.

A management system according to the present invention includes a plurality of devices, and a management apparatus that is communicably connected to the plurality of devices and stores backup data of the plurality of devices in a database. Each of the plurality of devices includes a position information acquisition section that acquires position information of the device, and a position information response section that transmits the position information or the backup data in response to a request of the management apparatus. The management apparatus includes a position information request section that acquires position information of each of the plurality of devices, and a device information association section that acquires the backup data from each of the plurality of devices and stores the backup data in the database in association with the position information. The device information association section restores the backup data included in the database, to the device that is present at a position corresponding to the position information associated with the backup data.

According to the present invention, it is possible to provide the management apparatus and the management system capable of backup and restore based on the position information of the device.

BRIEF DESCRIPTION OF THE DRAWINGS

FIG. 20 is a view showing the example of the process for acquiring the position information by the device;

FIG. 23 is a view showing an example of the data table;

DETAILED DESCRIPTION OF THE PREFERRED EMBODIMENTS

Figure 1:
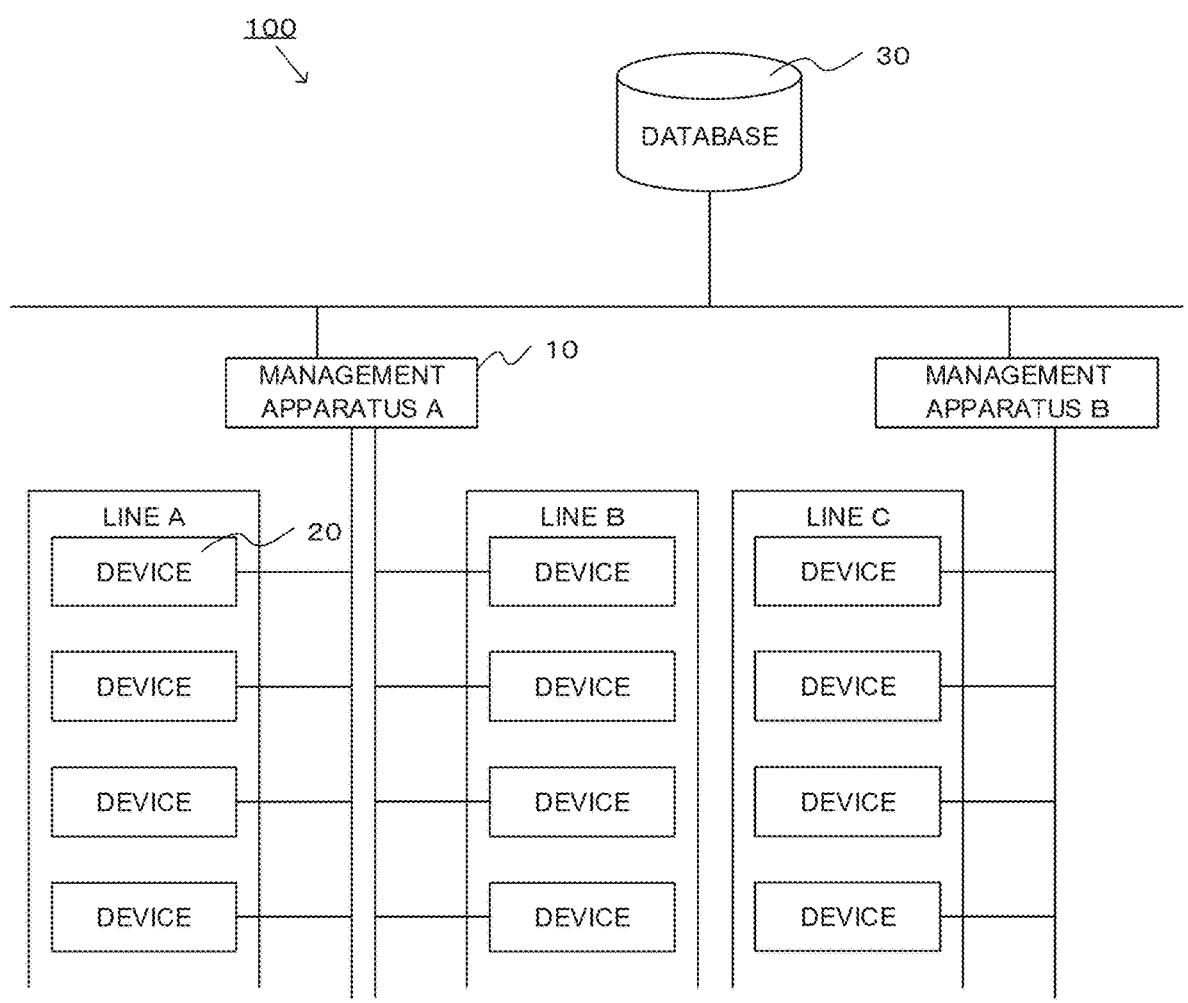
FIG. 1 is a block diagram showing the configuration of a management system.

FIG. 1 is a block diagram showing the configuration of a management system 100 according to an embodiment of the present invention.

The management system 100 has a management apparatus 10, a plurality of devices 20, and a database 30. Each of the management apparatus 10, the plurality of devices 20, and the database 30 is typically an information processor that includes a central processing unit (CPU), a storage device, and an input/output device. The CPU executes a predetermined program and a predetermined function is thereby implemented.

Figure 2:
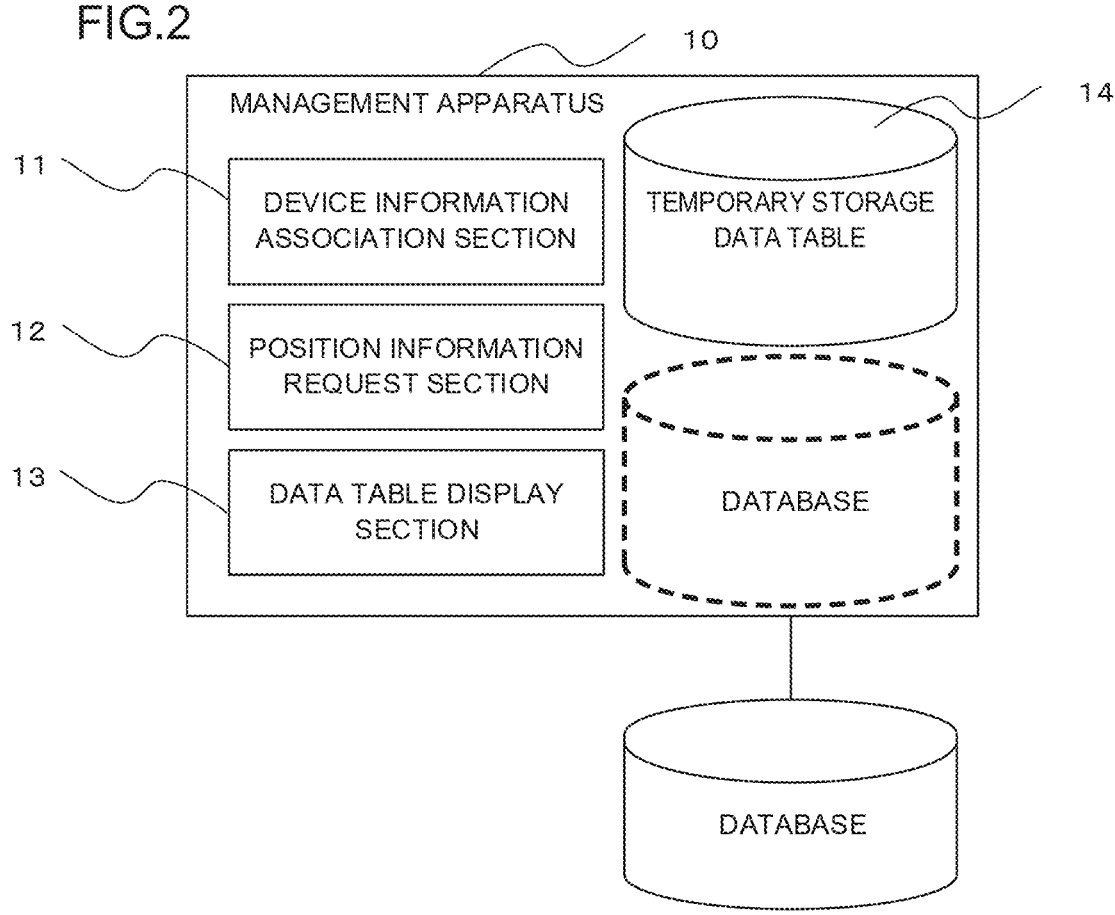
FIG. 2 is a block diagram showing the configuration of a management apparatus that constitutes the management system in FIG. 1.

FIG. 2 is a block diagram showing the configuration of the management apparatus 10 in FIG. 1.

The management apparatus 10 has a device information association section 11, a position information request section 12, a data table display section 13, and a temporary storage data table 14. Note that the database 30 is typically provided independently of the management apparatus 10, but may also be implemented in the management apparatus 10.

Figure 3:
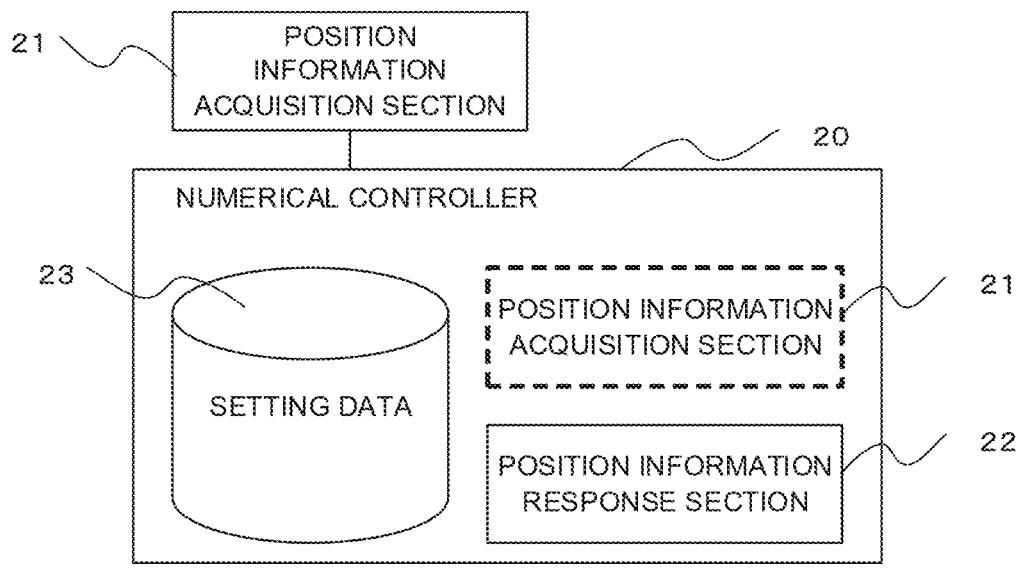
FIG. 3 is a block diagram showing the configuration of a device that constitutes the management system in FIG. 1.

FIG. 3 is a block diagram showing the configuration of the device 20 in FIG. 1.

The device 20 has a position information acquisition section 21, a position information response section 22, and setting data 23. Note that the position information acquisition section 21 may be provided in the device 20 and may also be an external device.

Figure 4:
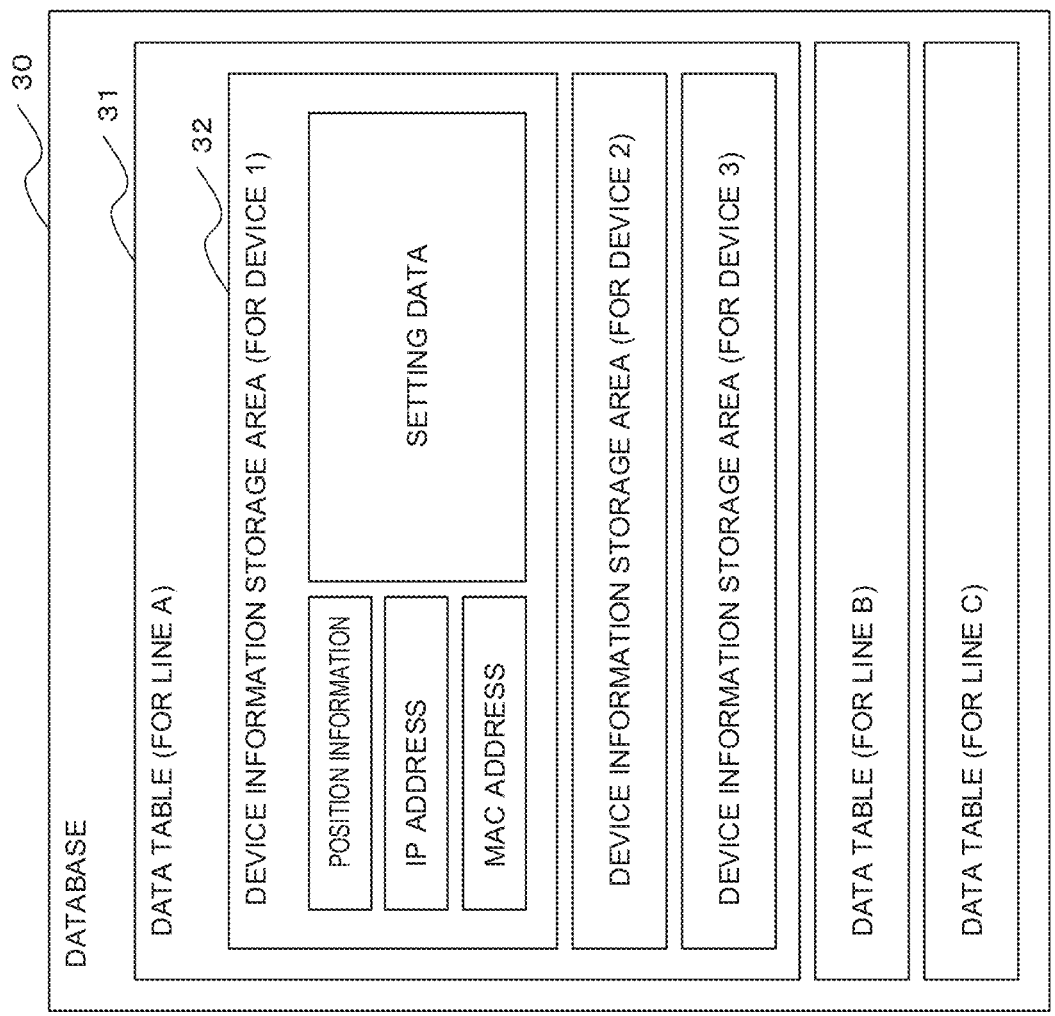
FIG. 4 is a block diagram showing the configuration of a database that constitutes the management system in FIG. 1.

FIG. 4 is a block diagram showing the configuration of the database 30 in FIG. 1.

The database 30 has one or more data tables 31. Each of the data tables 31 corresponds to a line installed in a factory or the like. Each data table 31 has one or more device information storage areas 32. Each of the device information storage areas 32 corresponds to the device 20 in the line. Each device information storage area 32 stores information such as position information, an IP address, a MAC address, and the setting data of the device 20.

Figure 5:
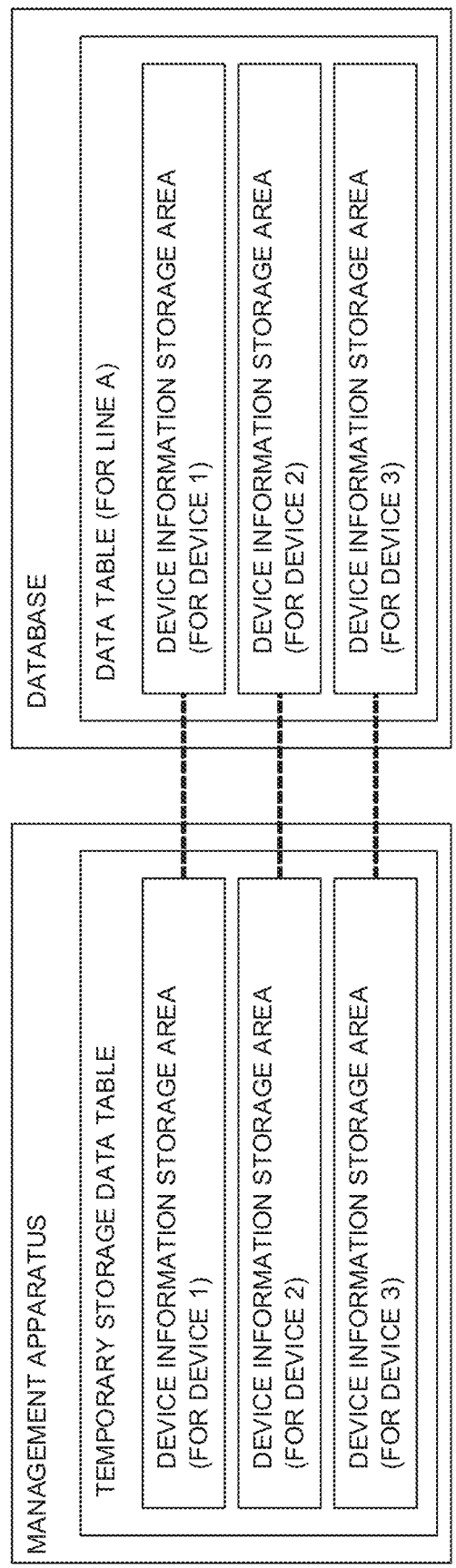
FIG. 5 is a view showing a relationship between a temporary storage data table in the management apparatus in FIG. 2 and a data table in the database in FIG. 4.

FIG. 5 is a view showing a relationship between the temporary storage data table 14 in FIG. 2 and the data table 31 in FIG. 4.

The temporary storage data table 14 is used as a temporary buffer for writing the device information in the corresponding data table 31 or as a retrieval key used for retrieving the corresponding data table 31 from the data base 30.

Next, by using flowcharts in FIG. 11 to FIG. 18, the operation of the management system 100 in FIG. 1 will be described.

The outline of the functions of the management system 100 will be described first, and the operation of each function will be described in detail next. The management system 100 mainly provides three functions of (1) backup of the device information associated with the position information, (2) restore of the device information that uses the position information, and (3) copy of the device information to another line that uses the position information.

(1) The backup of the device information associated with the position information is roughly implemented by the following steps.

First, the device 20 acquires the position information thereof by using a publicly known positioning system or the like. The management apparatus 10 communicates with all of the devices 20 by broadcast communication, and acquires the IP address, the MAC address, the position information and the like of each device 20. Preferably, the management apparatus 10 acquires the position information, the MAC address and the like also from the device 20 that does not have the IP address.

Next, the management apparatus 10 displays a list of the devices 20 on a screen. At this point, the management apparatus 10 preferably displays the devices 20 by mapping them based on the acquired position information. A user specifies the device 20 serving as a backup target from the display screen. In response to this, the management apparatus 10 acquires the setting data 23 from the specified device 20, and stores the setting data 23 in the device information storage area 32 of the data table 31 in association with the position information, the IP address, the MAC address and the like.

(2) The restore of the device information that uses the position information is roughly implemented by the following steps.

First, the management apparatus 10 communicates with all of the devices 20 by broadcast communication, and acquires the IP address, the MAC address, the position information and the like of each device 20. Herein, the management apparatus 10 acquires the position information, the MAC address and the like also from the device 20 that does not yet have the IP address due to replacement of a previous device or the like.

Next, the management apparatus 10 displays a list of the devices 20 on the screen. At this point, the management apparatus 10 preferably displays the devices 20 by mapping them based on the acquired position information. The user specifies the device 20 serving as a restore target from the display screen. The management apparatus 10 searches the database 30 to acquire backup data (the setting data 23, the position information, the IP address, the MAC address and the like) of the device 20 that has the position information coinciding with that of the specified device 20 or is positioned in the vicinity of the specified device 20. The management apparatus 10 communicates with the specified device 20 using the MAC address to restore the setting data 23, the IP address and the like of the backup data acquired from the database 30. Preferably, with regard to the backup data other than the IP address, after the IP address is restored, the management apparatus 10 performs communication using the IP address to restore the backup data.

(3) The copy of the device information to another line that uses the position information is roughly implemented by the following steps.

First, by the method described in (1), the management apparatus 10 acquires the setting data 23 and the like of the device 20 included in a line serving as a copy source, and stores the setting data 23 in the device information storage area 32 of the data table 31 in association with the position information, the IP address, the MAC address and the like.

Next, the management apparatus 10 communicates with all of the devices 20 included in a line serving as a copy destination by broadcast communication to acquire the IP address, the MAC address, and position information and the like of each device 20. The device 20 in the line serving as the copy destination does not yet have the IP address usually, and hence the management apparatus 10 acquires the position information, the MAC address and the like. The management apparatus 10 compares mutual geometric positional relationships or topologies of the devices 20 included in the line serving as the copy source and the line serving as the copy destination to thereby associate the device 20 in the line serving as the copy source and the device 20 in the line serving as the copy destination with each other using the position information. Lastly, the management apparatus 10 acquires the backup data of the device 20 in the line serving as the copy source from the database 30, and restores the setting data 23, the IP address and the like to the corresponding device 20 in the line serving as the copy destination.

(1) The backup of the device information associated with the position information will be described in detail.

First, a process in which the device 20 acquires the position information thereof will be described by using the flowchart in FIG. 12. Hereinbelow, the process will be described according to each step.

Step S201: The position information request section 12 of the management apparatus 10 transmits position information acquisition requests to all of the devices 20 in the line by broadcast communication.

Step S202: The position information acquisition section 21 of the device 20 acquires the position information of the device 20 by using the publicly known positioning system or the like. An available positioning method will be described later. In response, the position information response section 22 sends back the IP address, the MAC address and the like of the device 20 to the management apparatus 10 together with the position information obtained by the positioning.

Step S203: The position information request section 12 of the management apparatus 10 stores the position information and the like received from the device 20 in the temporary storage data table 14.

Step S204: Preferably, the management apparatus 10 waits for a predetermined time, and terminates the process when the information of all of the devices 20 is stored.

Figure 6:
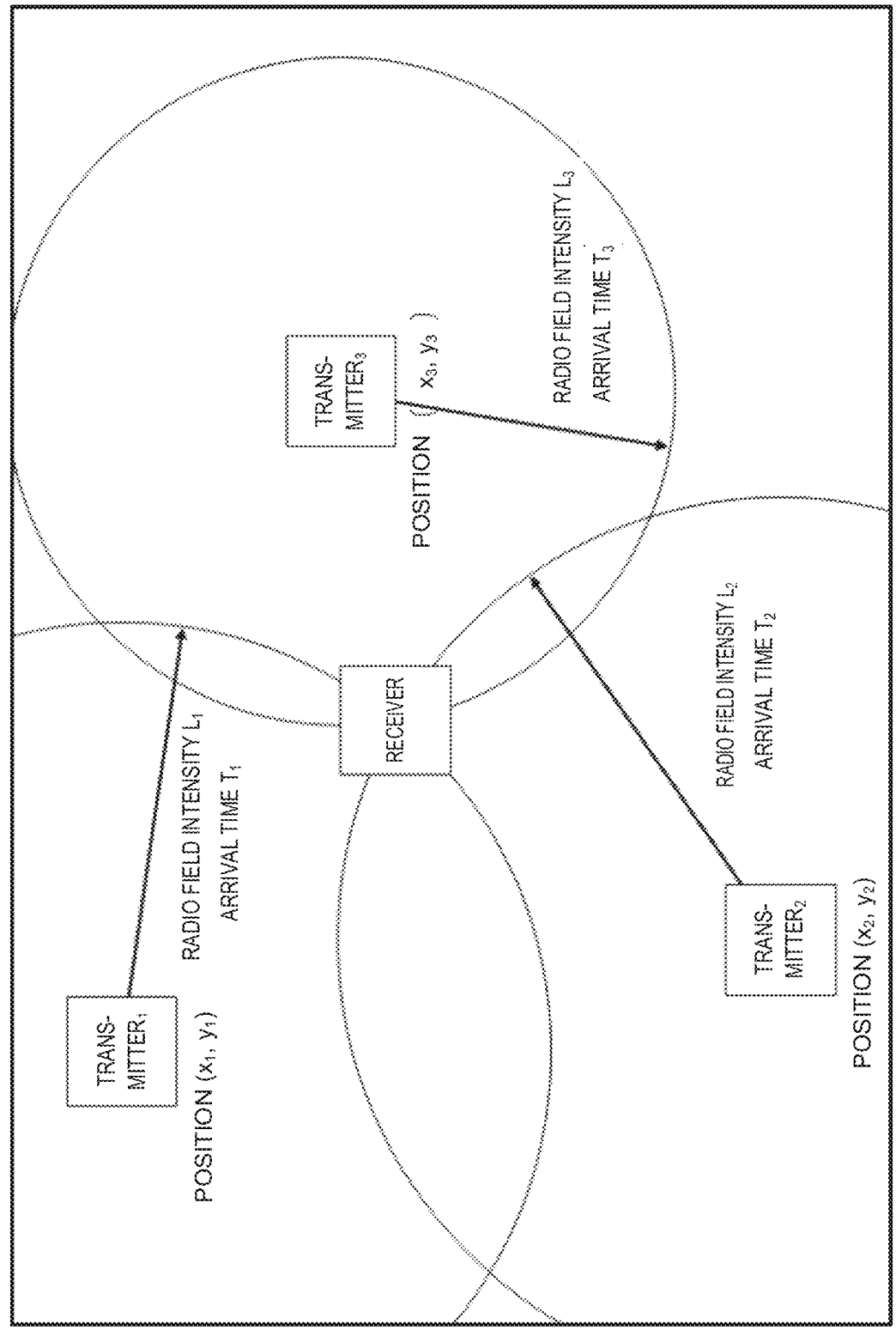
FIG. 6 is a view showing a positioning system.

Herein, an example of the existing positioning system will be described by using FIG. 6.

A receiver can receive signals from a plurality of transmitters by wireless communication means, and measure the positions of the receivers based on the position, radio field intensity, and signal arrival time of each transmitter. Examples of the wireless communication means include Wi-Fi (the 2.4 GHz band or 5 GHz band is used; it is widely used as a wireless LAN), ultra-wide band (UWE; radio waves in the 7.25 to 10.25 GHz band are used), indoor messaging system (IMES; the 1.5 GHz band is used; it is compatible with the GPS), and Bluetooth low energy beacon (BLE beacon; the extension specification of Bluetooth (registered trademark); radio waves in the 2.4 GHz band are used). In the present embodiment as well, the device 20 can measure the position thereof by using these techniques. In this case, it is assumed that a plurality of transmitters are present in a factory.

Figure 13:
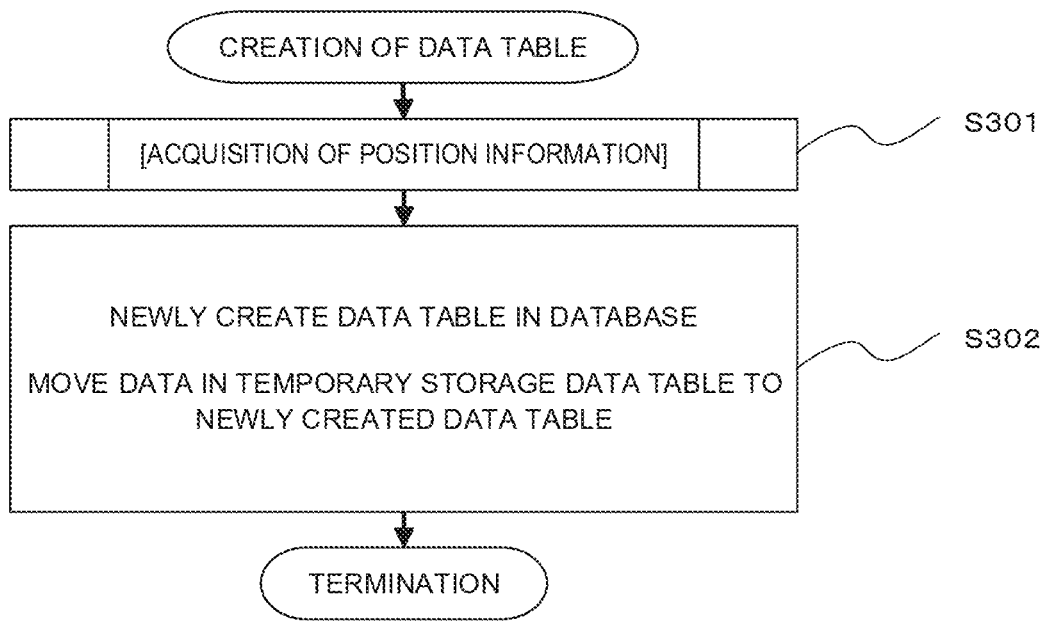
FIG. 13 is a view showing a process for creating the data table in the database.

Subsequently, a process for creating the data table 31 in the database 30 will be described by using the flowchart in FIG. 13.

Figure 12:
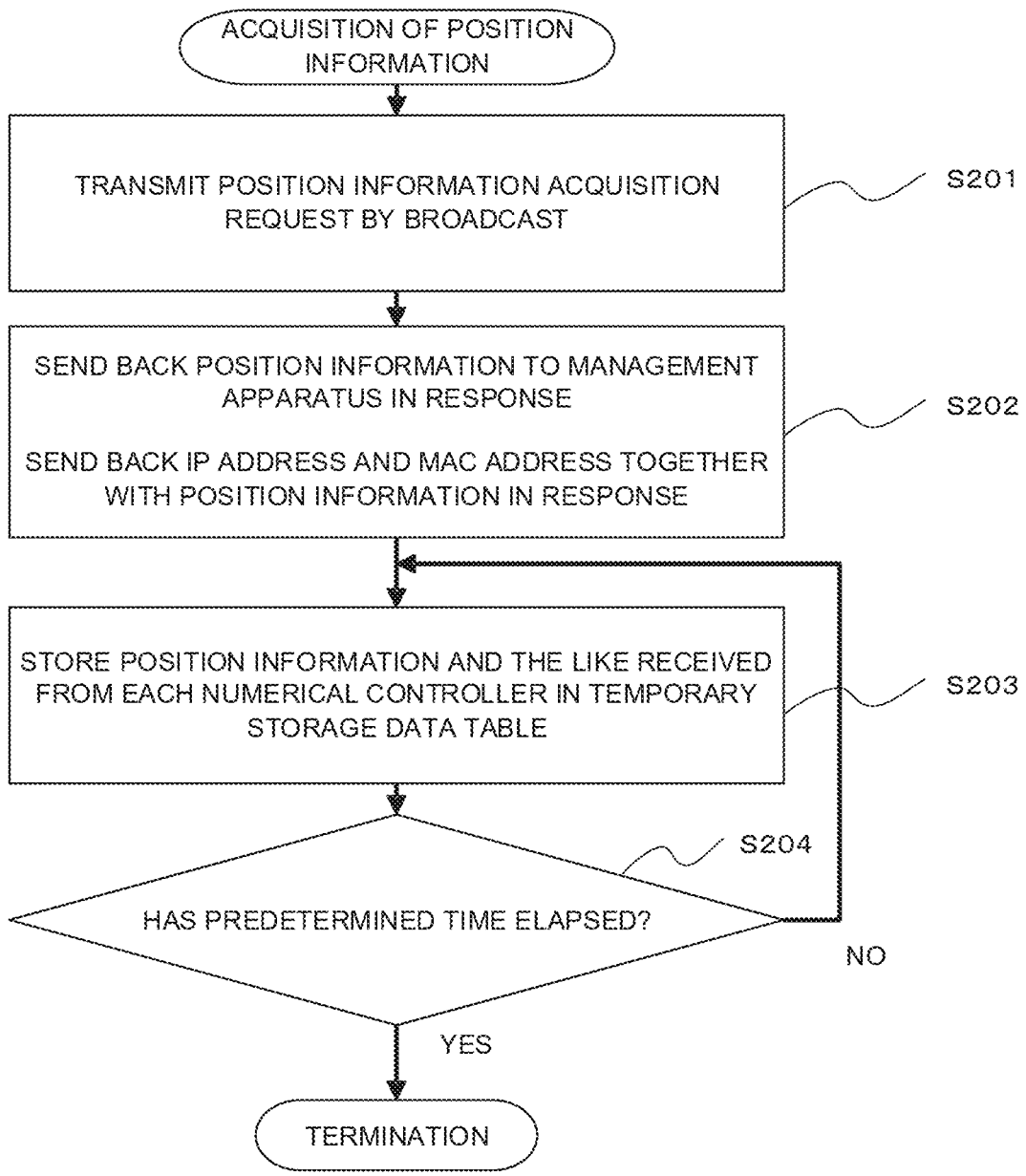
FIG. 12 is a view showing an acquisition process of the position information.

After a series of the processes (Step S301) shown in FIG. 12 in which the device 20 acquires the position information thereof are executed, the device information association section 11 of the management apparatus 10 newly creates the data table 31 in the database 30 (Step S302). The content of the temporary storage data table 14 is copied to the data table 31.

An example of the process in which the device 20 acquires the position information thereof will be described by using FIG. 19 and FIG. 20.

Figure 19:
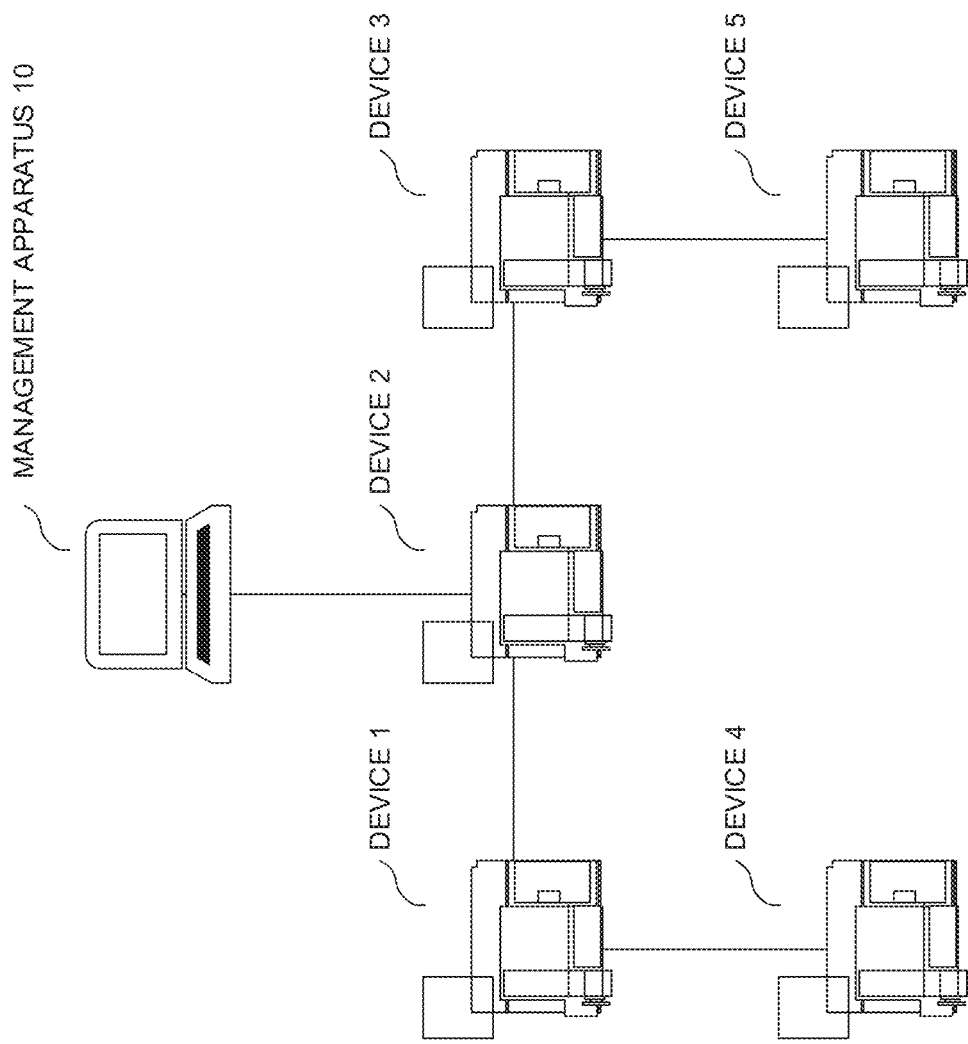
FIG. 19 is a view showing an example of a process for acquiring the position information by the device.

As shown in FIG. 19, it is assumed that the management apparatus 10 is connected to devices 1 to 5. FIG. 20 shows the data table 31 that is created by executing a series of the processes according to FIG. 12 and FIG. 13 by the management system 100 in FIG. 19. It can be seen that the position information, the IP address, and the MAC address of each of the devices are acquired and stored. Note that a backup process described later is not yet performed at this stage, and hence the setting data 23 is not stored.

Figure 15:
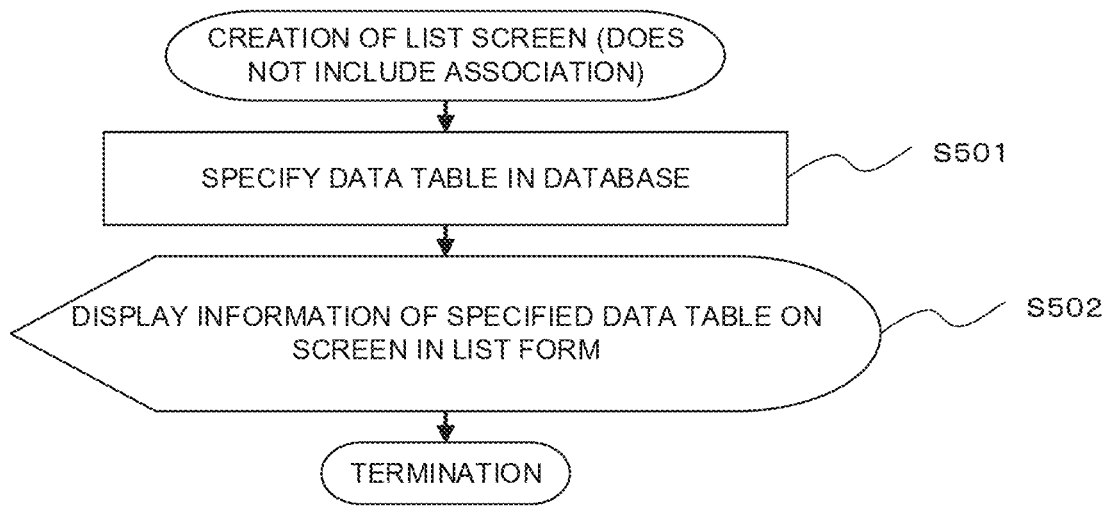
FIG. 15 is a view showing the creation process of the list screen.

Subsequently, a process for creating a list screen of the device 20 will be described by using the flowchart in FIG. 15.

Step S501: The data table display section 13 of the management apparatus 10 specifies one data table 31 in the database 30. Typically, the data table 31 that is newly created in Step S302 in FIG. 13 is specified. Note that the user may be allowed to specify any data table 31.

Figure 21:
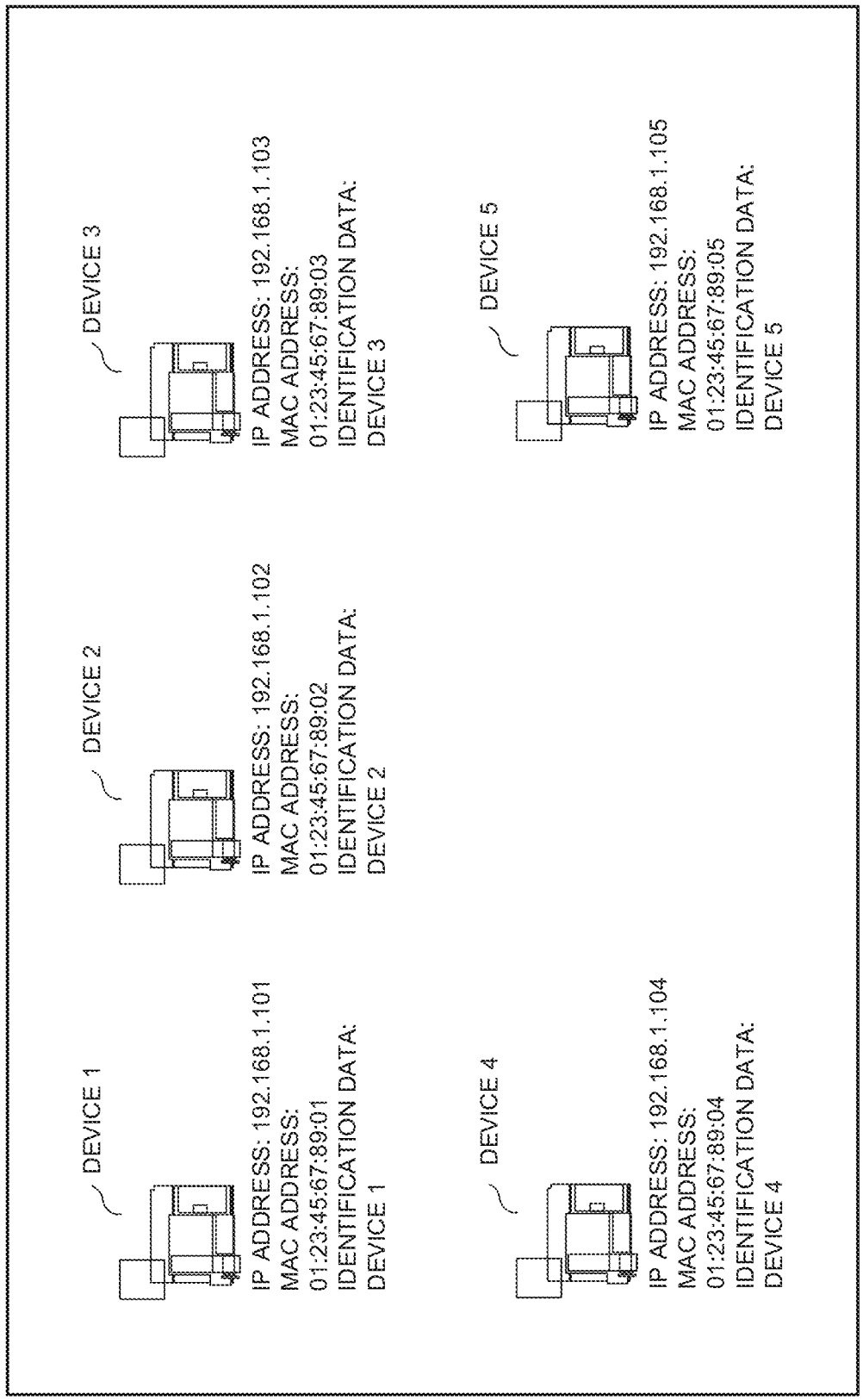
FIG. 21 is a view showing the example of the process for acquiring the position information by the device.

Step S502: The data table display section 13 acquires the content of the data table 31 specified in Step S501, and displays the content on the screen. Herein, the data table display section 13 may display the data table 31 as a table as shown in FIG. 20 or may also display the devices 20 by mapping them based on the position information as shown in FIG. 21. In FIG. 21, a relative positional relationship of the devices 1 to 5 on the screen reflects an actual relative positional relationship of the devices 1 to 5 (see FIG. 19) and, so to speak, the reduced drawing of the actual line is displayed on the screen.

The backup process of the device information associated with the position information will be described by using the flowchart in FIG. 16. Hereinbelow, the backup process will be described according to each step.

Step S601: The device information association section 11 of the management apparatus 10 determines whether or not the data table 31 is created in the database 30. In the case where the data table 31 is not present, the processing proceeds to Step S606. On the other hand, in the case where the data table 31 is present, the processing proceeds to Step S602.

Step S602: The device information association section 11 executes a process for associating the line serving as the backup target with the data table 31 serving as a backup destination. In addition, the data table display section 13 performs a process for displaying the content of the associated data table 31 on the screen. The details of these processes will be described later.

Step S603: The data table display section 13 receives an input that specifies the device 20 of which the backup is executed from among the devices 20 displayed on the screen.

Figure 22:
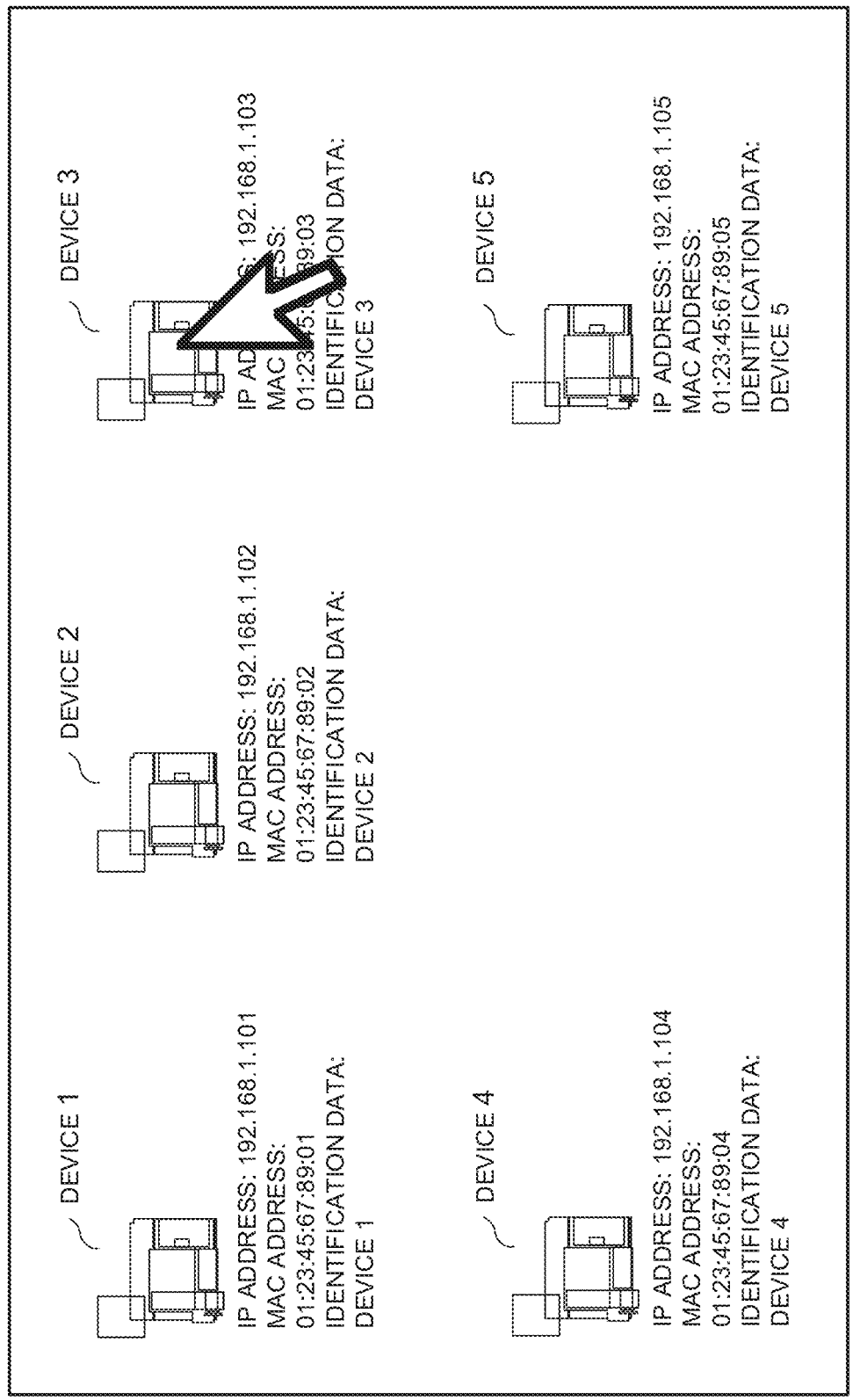
FIG. 22 is a view showing an example of a specification screen of the device of which backup is executed.

Herein, FIG. 22 shows an example of a specification screen of the device 20 of which the backup is executed. The data table display section 13 identifies one or more devices 20 selected by the user from among a plurality of the devices 20 mapped on the screen. The identified device 20 serves as the backup execution target.

Step S604: The device information association section 11 acquires the backup data from the device 20 specified in Step S603, and stores the backup data in the corresponding device information storage area 32 of the data table 31.

Figure 16:
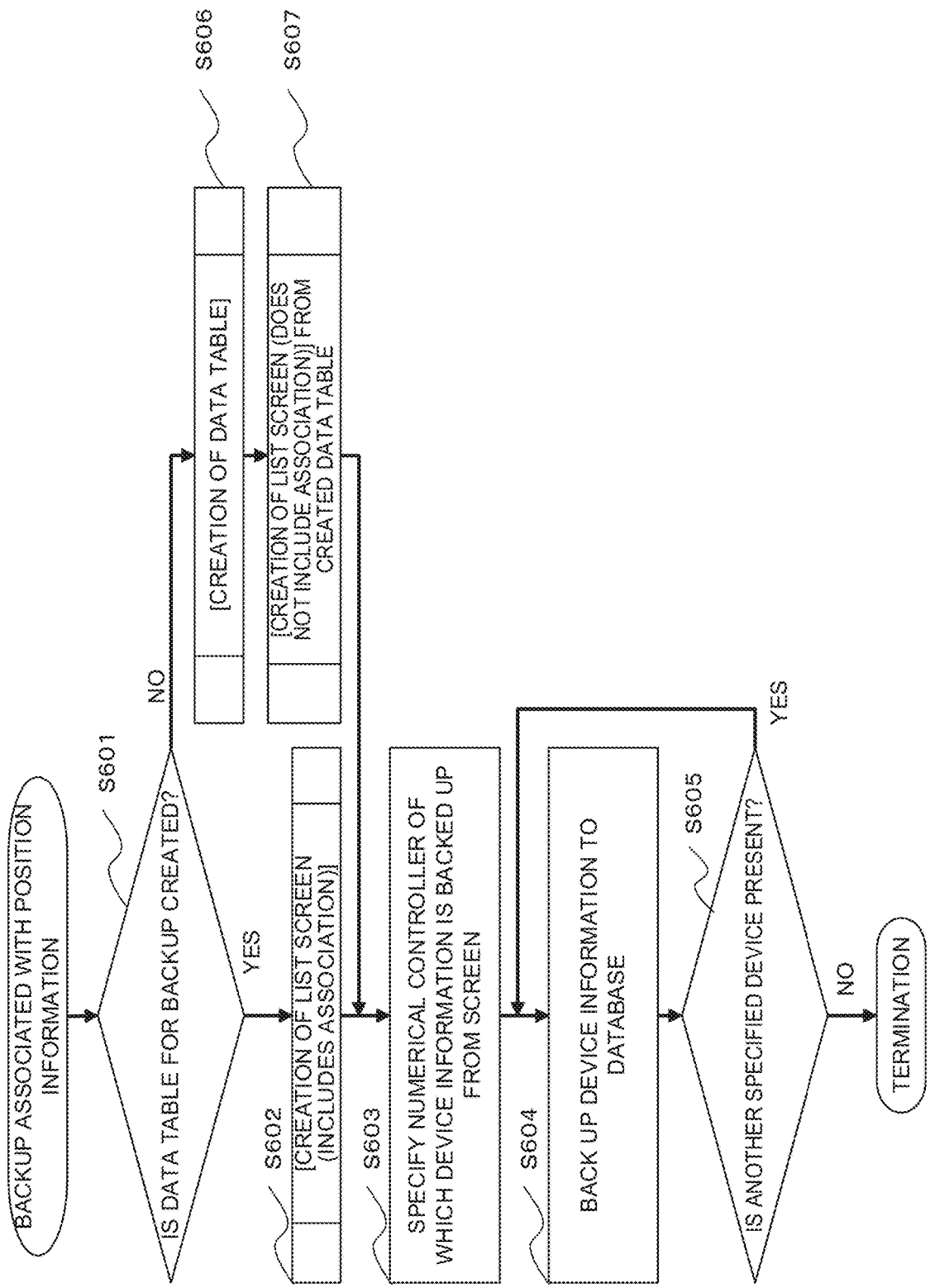
FIG. 16 is a view showing a backup process of device information associated with the position information.

Herein, FIG. 23 shows an example of the data table 31 created in Step S604 in FIG. 16. In this example, the setting data 23 and the like of each of the devices 1 to 3 are backed up.

Step S605: The device information association section 11 repeatedly performs the process in Step S604 on all of the devices 20 specified in Step S603.

Step S606: The device information association section 11 executes the creation process of the data table 31 shown in FIG. 13.

Step S607: The data table display section 13 executes the creation process of the list screen shown in FIG. 15.

Figure 14:
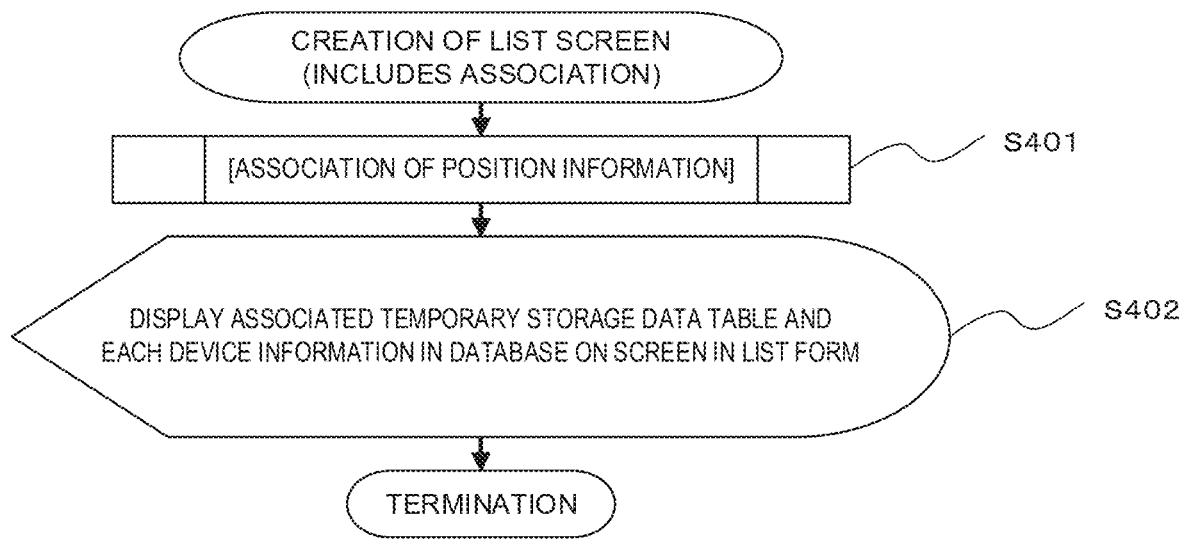
FIG. 14 is a view showing a creation process of a list screen.

The creation process of the list screen in Step S602 in FIG. 16 will be described in detail by using FIG. 14.

Step S401: The device information association section 11 performs the process for associating the line serving as the backup target with the data table 31 serving as the backup destination. The details of this process will be described later.

Step S402: The data table display section 13 performs the process for displaying the content of the data table 31 associated in Step S401 or the temporary storage data table 14 on the screen. Herein, the data table display section 13 may display the content of the data table 31 or the temporary storage data table 14 in a form of a table or may also display the devices 20 by mapping them based on the position information as shown in FIG. 21. In FIG. 21, the relative positional relationship of the devices 1 to 5 on the screen reflects the actual relative positional relationship of the devices 1 to 5 (see FIG. 19) and, so to speak, the reduced drawing of the actual line is displayed on the screen.

The association process of the position information in Step S401 in FIG. 14 will be described in detail by using the flowchart in FIG. 11. With this process, the line serving as the backup target is associated with the data table 31 serving as the backup destination. Hereinbelow, the process will be described according to each step.

Step S101: The management apparatus 10 executes the position information acquisition process shown in FIG. 12.

Step S102: The device information association section 11 receives the specification of the data table 31 that is to be associated (i.e., serving as the storage destination of the backup data). Typically, one or more data tables 31 specified by any user input are handled as the specified data tables 31 described above.

Step S103: The device information association section 11 compares the position information in the temporary storage data table 14 created in Step S101 with the position information in the data table 31 specified in Step S102 to thereby associate the devices 20 included in these tables on a one-to-one basis.

Herein, in the case where the backup process is performed, it is presumed that the device 20 that is previously backed up (the information thereof is stored in the data table 31) is identical to the device 20 that is backed up this time (the information thereof is stored in the temporary storage data table 14), and the position information of the device 20 that is previously backed up is substantially identical to the position information of the device 20 that is backed up this time. In this case, the device information association section 11 recognizes, as existing corresponding devices 20, the devices 20 for which the position information in the temporary storage data table 14 and the position information in the data table 31 specified in Step S102 fall within a predetermined error range.

In the case where the correspondence of all of the devices 20 or a predetermined number of the devices 20 or more in the temporary storage data table 14 and the data table 31 is determined, the device information association section 11 recognizes that the temporary storage data table 14 is associated with the data table 31.

Step S104: The device information association section 11 repeatedly performs the process in Step S103 on all of the devices 20 specified in Step S102.

Step S105: The device information association section 11 determines whether or not one or more data tables 31 that are successfully associated are present. In the case where such data tables 31 are present, the processing proceeds to Step S106. In the case where such data tables 31 are not present, this process is terminated (abnormally terminated).

Step S106: In the case where a plurality of the data tables 31 that are successfully associated are present, the device information association section 11 selects one of the data tables 31. Typically, the device information association section 11 selects one data table 31 based on the user input.

(2) The restore of the device information that uses the position information will be described in detail.

Figure 17:
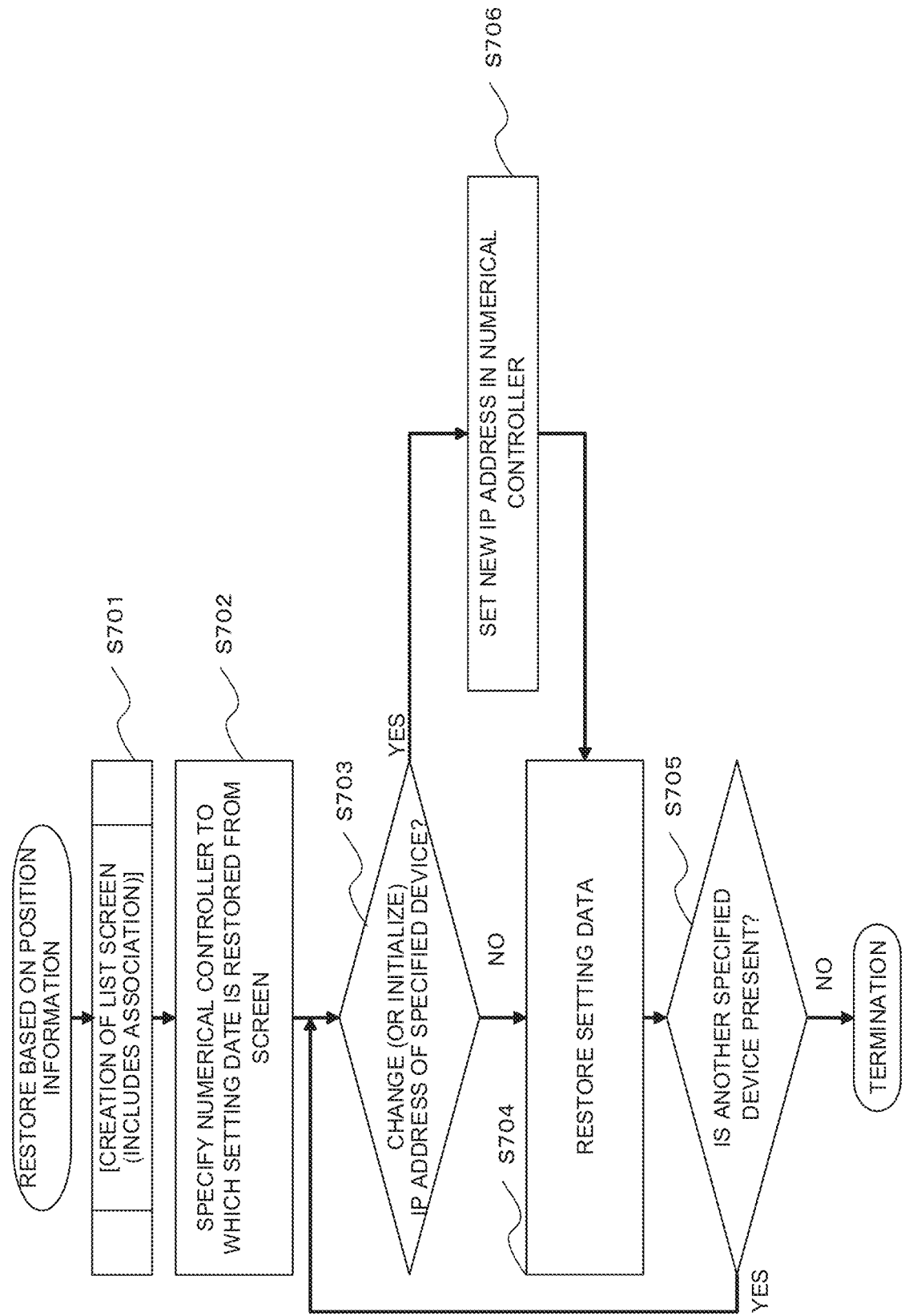
FIG. 17 is a view showing a restore process based on the position information.

A restore process based on the position information will be described by using the flowchart in FIG. 17. Hereinbelow, the restore process will be described according to each step.

Step S701: The management apparatus 10 executes the creation process of the list screen shown in FIG. 14.

Step S702: The data table display section 13 receives an input that specifies one or more devices 20 of which the restore is executed from among the devices 20 displayed on the screen.

Figure 24:
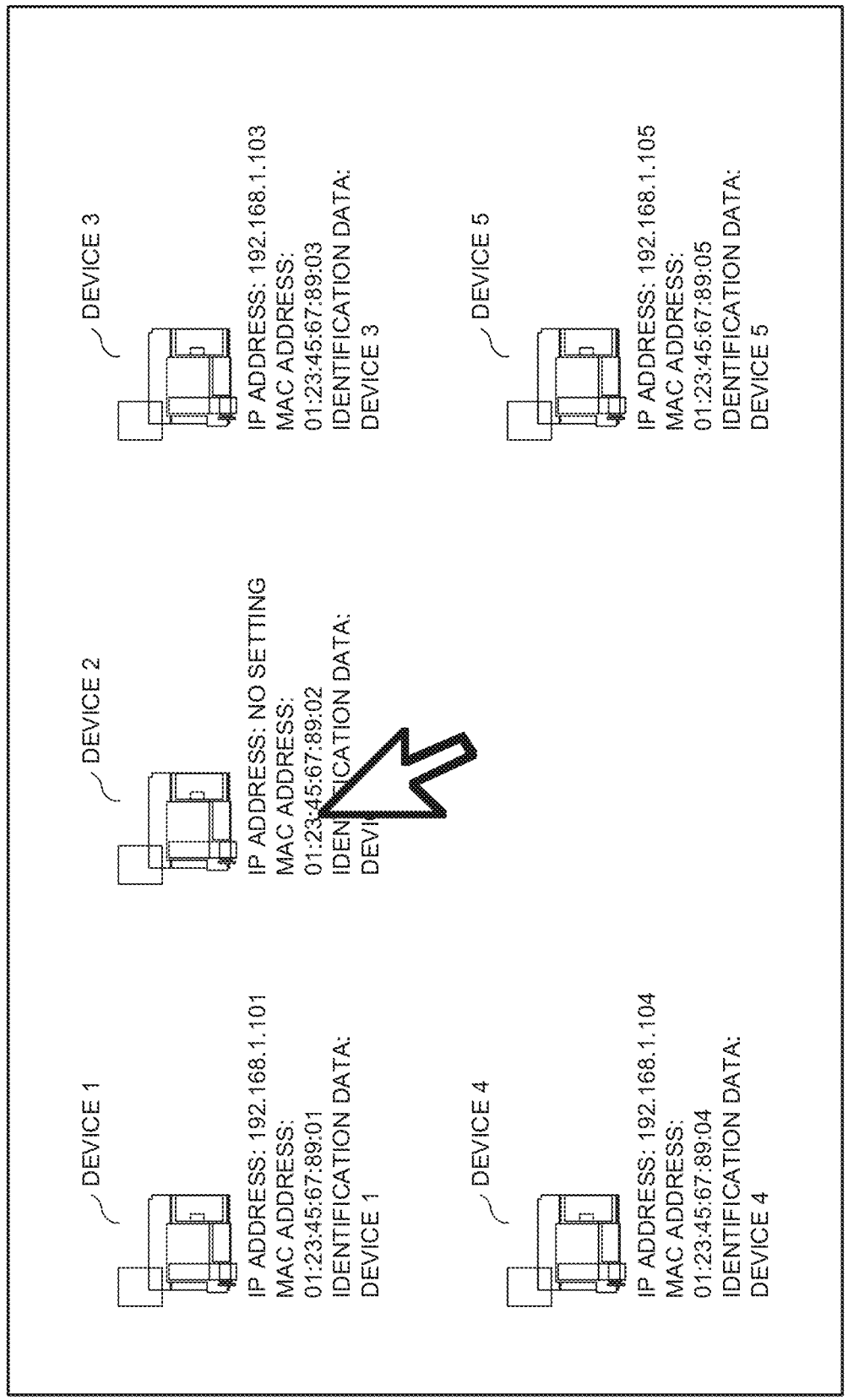
FIG. 24 is a view showing an example of a specification screen of the device of which restore is executed.

Herein, FIG. 24 shows an example of the specification screen of the device 20 of which the restore is executed. The data table display section 13 identifies one or more devices 20 selected by the user from among a plurality of the devices 20 mapped on the screen. The identified device 20 serves as the restore execution target.

Step S703: Preferably, the device information association section 11 receives an input indicative of whether or not any IP address is set in the device 20 specified in Step S702. The processing proceeds to Step S706 in the case where the IP address is set, and the processing proceeds to Step S704 in the case where the IP address is not set.

Step S704: The device information association section 11 acquires the backup data of the device 20 corresponding to the device 20 specified in Step S702 from the data table 31 selected in Step S701. The backup data can include, e.g., the setting data 23 and the IP address. The device information association section 11 restores the acquired backup data to the device 20 specified in Step S702.

Step S705: The device information association section 11 repeatedly performs the processes in and after Step S703 on all of the devices 20 specified in Step S702.

Step S706: The device information association section 11 sets any IP address in the specified device 20. As the IP address, it is possible to use, e.g., the IP address of the device 20 corresponding to the device 20 specified in Step S702 that is stored in the data table 31. Alternatively, the device information association section 11 may set the IP address that is not used on a network. Alternatively, the IP address specified by the user may also be used.

(3) The copy of the device information to another line that uses the position information will be described in detail.

Figure 18:
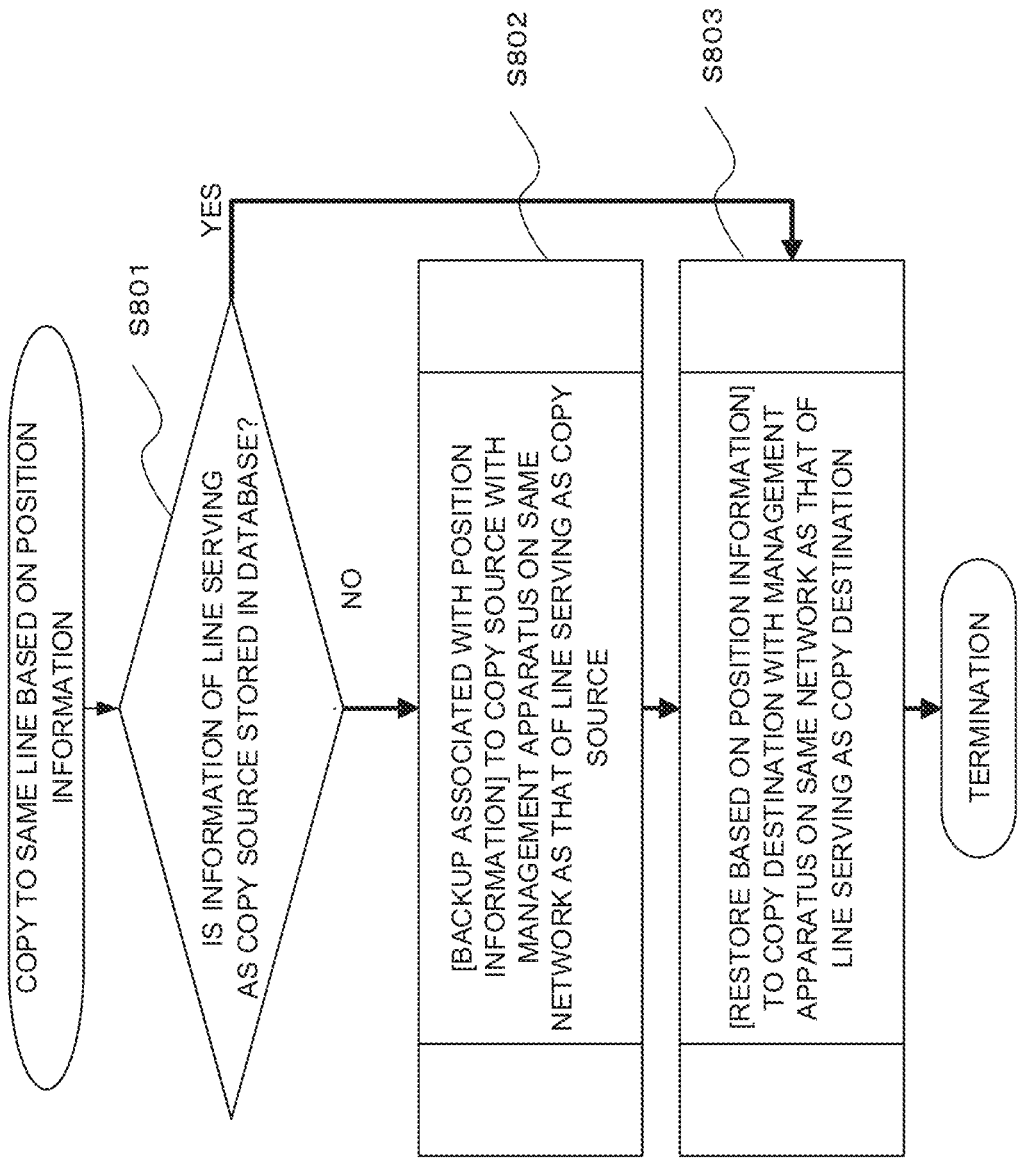
FIG. 18 is a view showing a copy process to another line based on the position information.

A copy process to another line based on the position information will be described by using the flowchart in FIG. 18 and FIG. 25.

Step S801: The device information association section 11 determines whether or not the information of the line serving as the copy source (the devices 1 to 5 in an example in FIG. 25) is backed up and stored in the data table 31 of the database 30. The processing proceeds to Step S803 when the information is stored, and the processing proceeds to Step S802 in the case where the information is not stored.

Step S802: The management apparatus 10 executes the backup process associated with the position information shown in FIG. 16 in the line serving as the copy source.

Step S803: The management apparatus 10 executes the restore process based on the position information shown in FIG. 17 in the line serving as the copy destination (devices 11 to 15 in the example in FIG. 25).

Figure 10:
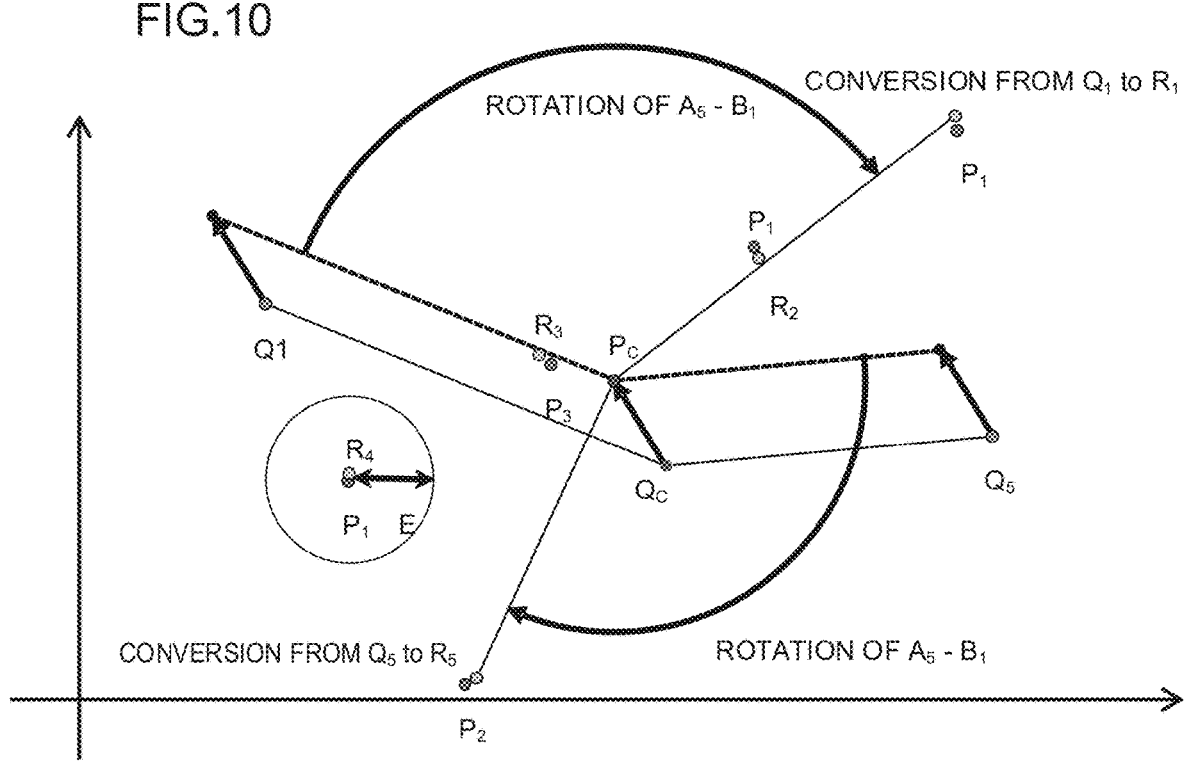
FIG. 10 is a view showing the example of the process for associating the device in the temporary storage data table with the device in the data table.
Figure 11:
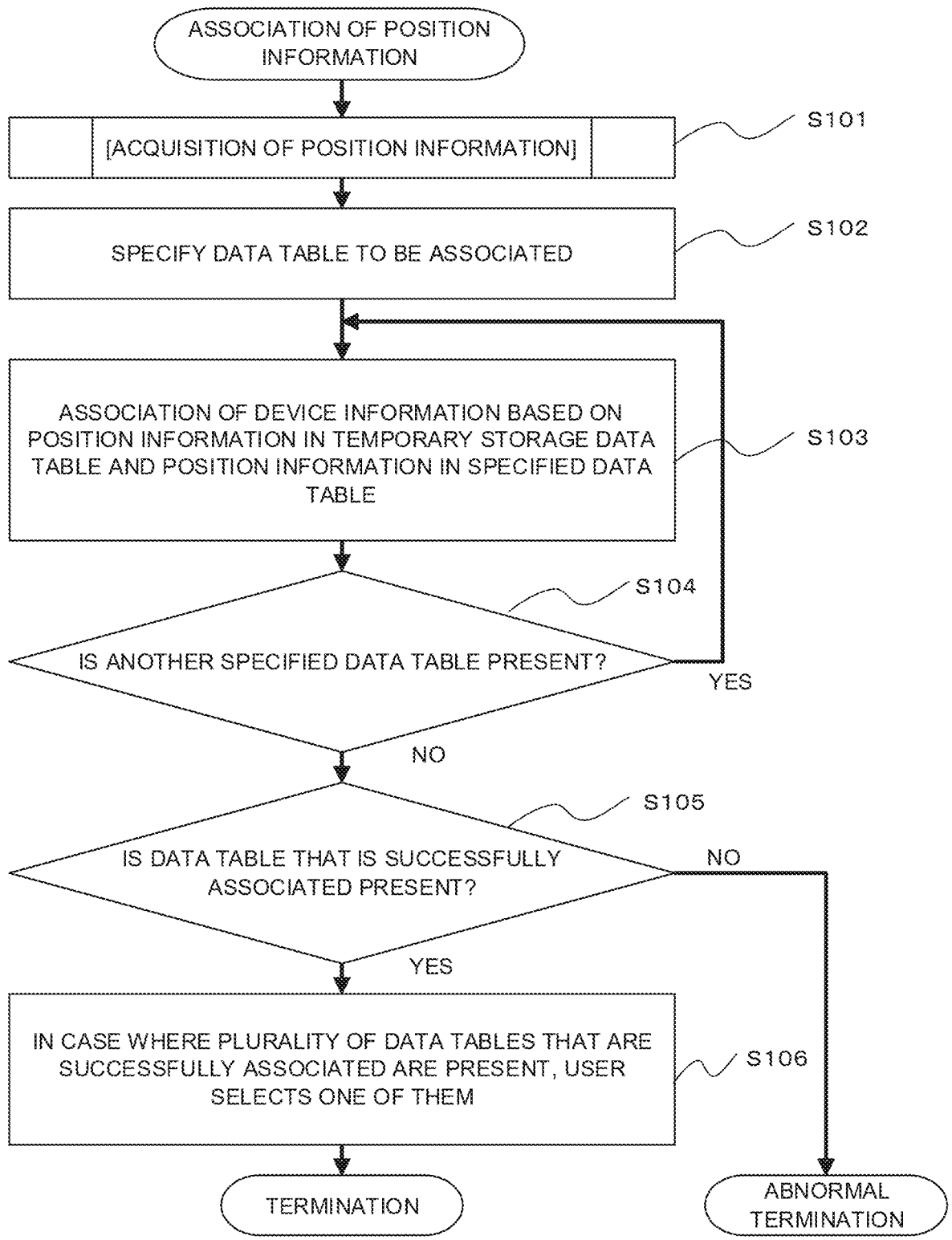
FIG. 11 is a view showing an association process of position information.

Herein, in the case where the copy process of the line is performed, normally, it is necessary to perform a process different from the above-described process when the process in Step S103 of the flowchart in FIG. 11 is performed. In general, in the copy process of the line, the device 20 serving as the copy source (the information thereof is stored in the data table 31) is different from the device 20 serving as the copy destination (the information thereof is stored in the temporary storage data table 14) and installation positions thereof are also different from each other, and hence the position information of the device 20 serving as the copy source is probably different from that of the device 20 serving as the copy destination. In this case, the device information association section 11 associates the device 20 in the temporary storage data table 14 with the device 20 in the data table 31 by a method shown in FIG. 7 to FIG. 10. Hereinbelow, this association process will be described in detail.

Figure 7:
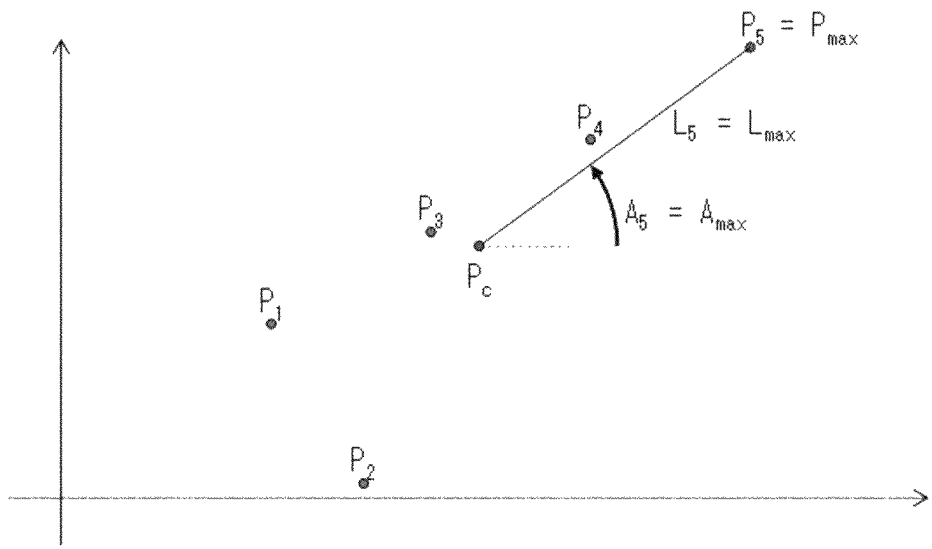
FIG. 7 is a view showing an example of a process for associating the device in the temporary storage data table with the device in the data table.

As shown in FIG. 7, it is assumed that the position information (x and y coordinates) of each of N devices 1 to N stored in the data table 31 is $P_n$ ($n=1, 2, 3 \ldots N$). It is assumed that the center of P1, P2, ... PN is Pc and a length from the center Pc to the coordinate position $P_n$ ($n=1, 2, 3 \ldots N$) of each device is $L_n$. It is assumed that an angle of the coordinates $P_n$ when an X axis direction corresponds to 0 degrees with the center Pc used as the original (an angle formed by the X axis and a segment Pc–Pn) is $A_n$. It is assumed that the longest length $L_n$ of the segment Pc–Pn is Lmax, and the coordinates and the angle corresponding to Lmax are Pmax and Amax.

Figure 8:
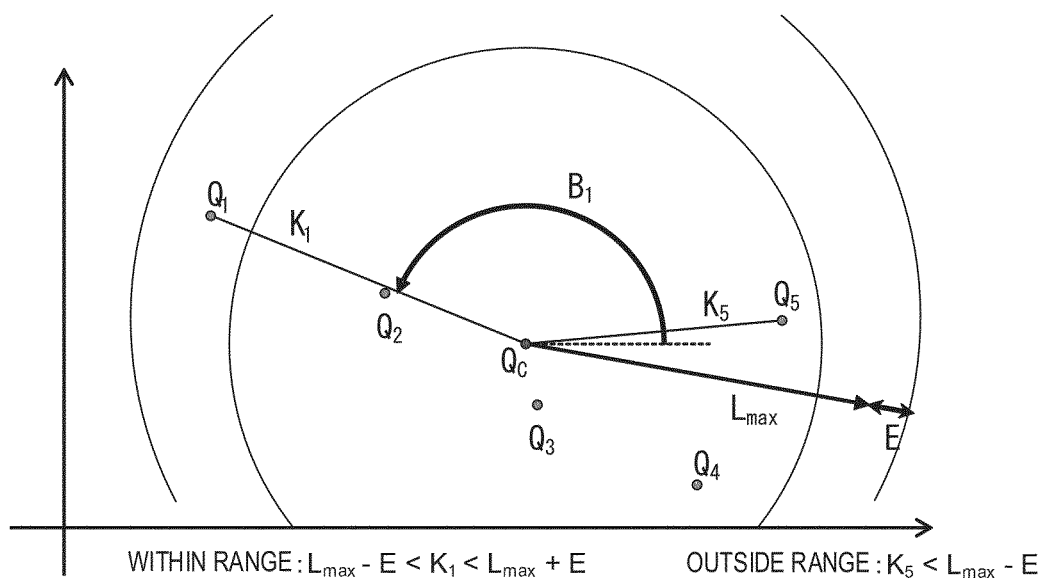
FIG. 8 is a view showing the example the process for associating the device in the temporary storage data table with the device in the data table.

As shown in FIG. 8, similarly, it is assumed that the coordinates obtained from each of devices 1 to M serving as the copy destinations, and the center, length, and angle thereof are $Q_m$, Qc, $K_m$, and $B_m$ ($m=1, 2, 3 \ldots M$). In order to retrieve a candidate for the coordinates Q corresponding to Pmax, all of coordinates Qs ($S \subseteq \{1, 2, 3, \ldots, N\}$) that satisfy $(K_m-E)<L_{max}<(K_m+E)$ and have similar lengths from the center are determined. Herein, E is a constant that satisfies (measurement error of position information×2) <E<shortest length between devices. In an example in FIG. 8, Q1 is the only candidate.

Figure 9:
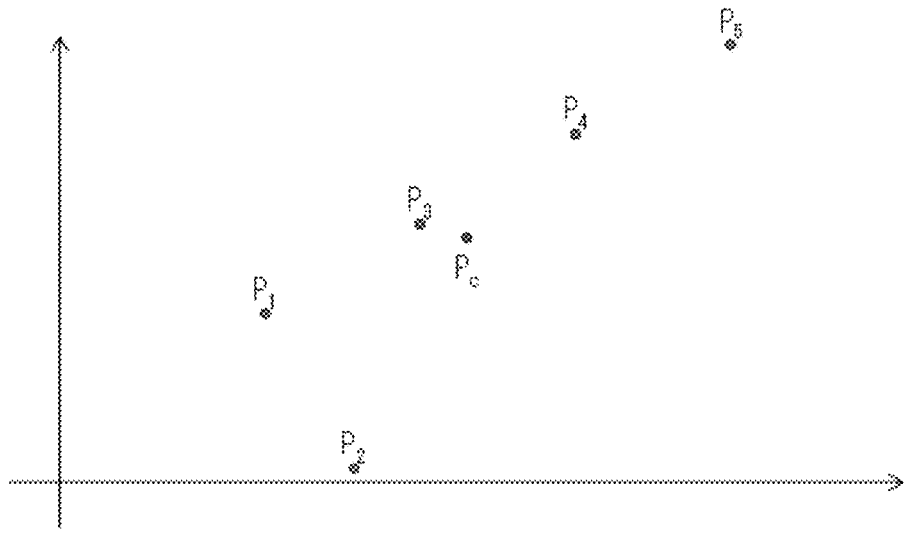
FIG. 9 is a view showing the example of the process for associating the device in the temporary storage data table with the device in the data table.

As shown in FIG. 9 and FIG. 10, in order to determine the coordinates corresponding to Pmax from the candidate Qs, an operation in which each Qs is moved parallel and rotated and the coordinates of Pmax are thereby caused to coincide with those of Qs is performed on each Qm. It is assumed that the result of this operation is Rm.

$$R=(Qm-Qc) \times ROT(A\max-Bs)+Pc$$

In an example in FIG. 10, an operation in which each Qs is moved parallel such that Qc coincides with the original first, rotated by Amax−Bs degrees such that the angle Bs coincides with the angle Amax next, and moved parallel such that the center coincides with Pc last is performed. At this point, R1≈P5 is satisfied, and hence P5 corresponds to Q1. R2≈P4 is satisfied, and hence P4 corresponds to Q2. R3≈P3 is satisfied, and hence P3 corresponds to Q3. R4≈P1 is satisfied, and hence P1 corresponds to Q4. R5≈P2 is satisfied, and hence P2 corresponds to Q5.

Figure 25:
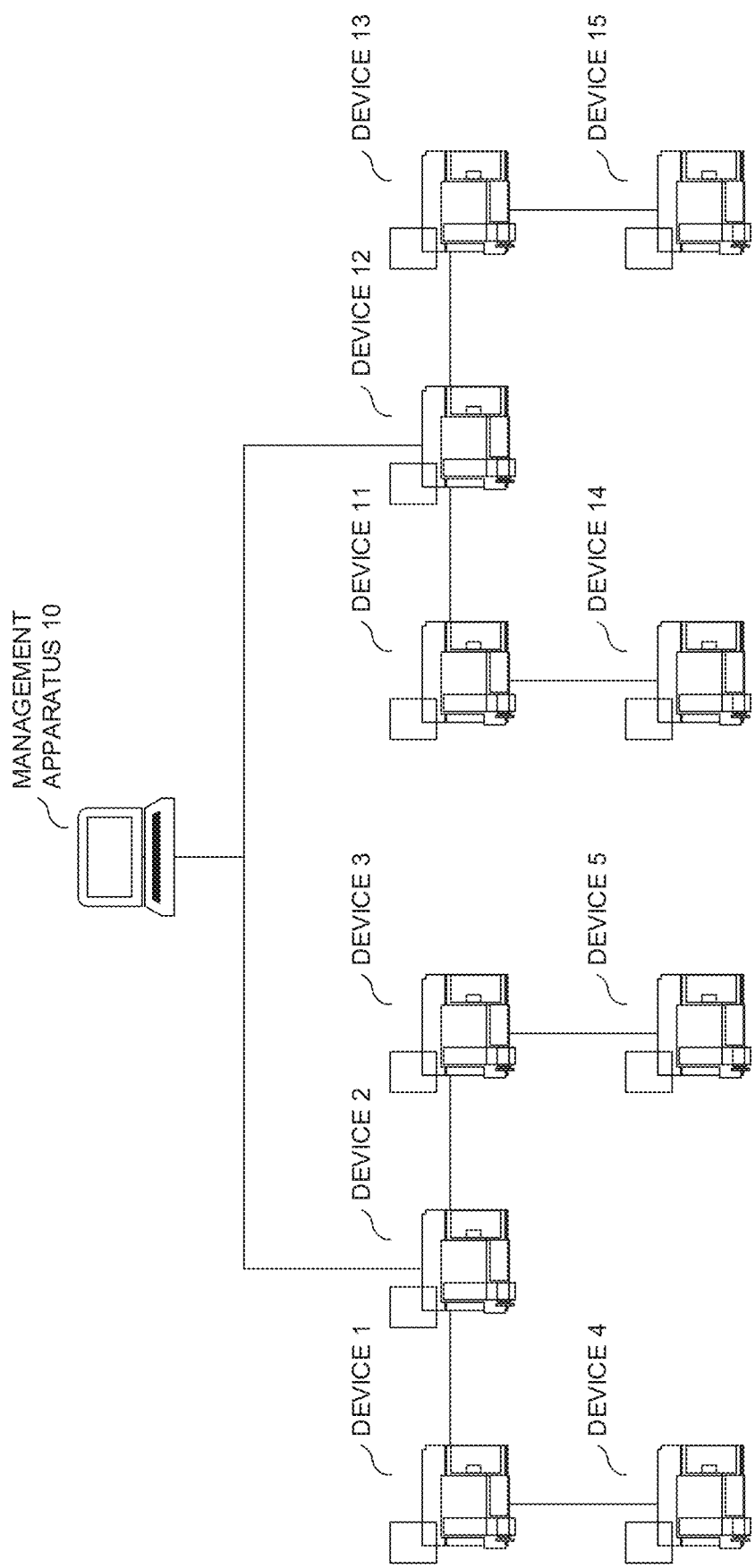
FIG. 25 is a view showing a copy process to another line based on the position information.

In the above embodiment, the same management apparatus 10 is used in the line serving as the copy source and the line serving as the copy destination in FIG. 25, but the management apparatus 10 used in the line serving as the copy source may also be different from the management apparatus 10 used in the line serving as the copy destination. However, the data table 31 referenced at the time of the restore in the line serving as the copy source needs to be the data table 31 checked in Step S801 or the data table 31 created in Step S802.

According to the present embodiment, the management apparatus 10 backs up the device information together with the position information, and restores the device information based on the position information. Accordingly, it becomes possible to reduce the labor of the user in the restore and the addition of the line resulting from the replacement of the device.

Note that the present invention is not limited to the above embodiment, and can be appropriately changed without departing from the gist thereof. It is possible to modify any components in the embodiment or omit any components in the embodiment within the scope of the invention.

For example, the above embodiment has described the method for identifying the communication partner by using the MAC address on the assumption that the device 20 and the management apparatus 10 are connected to each other by an Ethernet (registered trademark) network. However, it will be easily understood that the present invention can be applied to any network other than the Ethernet network. In this case, the device 20 and the management apparatus 10 may perform communication by using any identifier that allows identification of the communication partner.

In addition, the above embodiment has described the setting data 23 and the IP address as the backup data, but the present invention is not limited thereto and it is possible to use any data that can be acquired from the device 20 as the backup data.

The invention claimed is:

1. A management apparatus communicably connected to a plurality of devices and storing backup data of the plurality of devices in a database, the management apparatus comprising:
a display configured to display a list of the plurality of devices on a screen;
a central processing unit (CPU) configured to:

acquire position information of each of the plurality of devices; and acquire the backup data from each of the plurality of devices and store the backup data in the database in association with the position information, wherein the CPU is further configured to:

compare relative positional relationships between the position information associated with the backup data of the plurality of devices included in the database and the position information of devices specified from the plurality of devices displayed on the screen of the display, and restore the backup data between the devices having pieces of position information corresponding to each other, wherein the backup data include at least setting data and the position information;

restore the setting data acquired from the database to the devices specified through the display, wherein the database comprises a data table for storing the position information of the plurality of devices as source of an association process by the CPU; and a temporary storage data table for storing the position information of the plurality of devices as destination of the association process by the CPU, wherein the temporary storage data table serves as a temporary buffer for writing the position information of the plurality of devices or as a retrieval key for retrieving the data table from the data base, and wherein the CPU is further configured to associate the position information stored in the temporary storage data table of the management apparatus with the position information stored in the data table of the database.

2. A management apparatus communicably connected to a plurality of devices and storing backup data of the plurality of devices in a database, the management apparatus comprising:

a central processing unit (CPU) configured to:

acquire position information of each of the plurality of devices; and acquire the backup data from each of the plurality of devices and store the backup data in the database in association with the position information, compare relative positional relationships between the position information associated with the backup data of the plurality of devices included in the database and the position information of the plurality of devices serving as restore destinations, and restore the backup data between the devices having pieces of position information corresponding to each other, restore the backup data included in the database to the device that is positioned within a predetermined error range from the position information associated with the backup data, wherein the database comprises a data table for storing the position information of the plurality of devices as source of an association process by the CPU; and a temporary storage data table for storing the position information of the plurality of devices as destination of the association process by the CPU, wherein the temporary storage data table serves as a temporary buffer for writing the position information of the plurality of devices or as a retrieval key for retrieving the data table from the data base and wherein the CPU is further configured to associate the position information stored in the temporary storage data table of the management apparatus with the position information stored in the data table of the database.

3. A management system, comprising:

a plurality of devices; and a management apparatus that is communicably connected to the plurality of devices and stores backup data of the plurality of devices in a database, wherein each of the plurality of devices includes a first central processing unit (CPU) configured to acquire position information of the device; and transmit the position information or the backup data in response to a request of the management apparatus;

a display configured to display a list of the plurality of devices on a screen;

a second central processing unit (CPU) configured to acquire position information of each of the plurality of devices; and acquire the backup data from each of the plurality of devices and store the backup data in the database in association with the position information, compare relative positional relationships between the position information associated with the backup data of the plurality of devices included in the database and the position information of devices specified from the plurality of devices displayed on the screen of the display, and restore the backup data between the devices having pieces of position information corresponding to each other the backup data include at least setting data and the position information, restore the setting data acquired from the database to the devices specified through the display, wherein the database comprises a data table for storing the position information of the plurality of devices as source of an association process by the second CPU; and a temporary storage data table for storing the position information of the plurality of devices as destination of the association process by the second CPU, wherein the temporary storage data table serves as a temporary buffer for writing the position information of the plurality of devices or as a retrieval key for retrieving the data table from the data base and wherein the second CPU is further configured to associate the position information stored in the temporary storage data table of the management apparatus with the position information stored in the data table of the database.

* * * * *